United States Patent [19]
Okajima et al.

[11] Patent Number: 5,777,604
[45] Date of Patent: Jul. 7, 1998

[54] TOUCH PANEL INPUT APPARATUS PERFORMING A SAMPLING OPERATION INTERMITTENTLY

[75] Inventors: Yoshio Okajima, Nara; Kazumasa Kimura; Tazo Nishida, both of Yamatokooriyama, all of Japan

[73] Assignee: Sharp Kabushiki Kaisha, Osaka, Japan

[21] Appl. No.: 467,294

[22] Filed: Jun. 6, 1995

[30] Foreign Application Priority Data

Oct. 31, 1994 [JP] Japan ................. 6-266622

[51] Int. Cl.⁶ ........................................ G09G 3/00
[52] U.S. Cl. .......................... 345/173; 178/19; 364/707; 345/211
[58] Field of Search ............................ 345/104, 173, 345/174, 179, 182, 175–178, 180, 181, 183, 211; 178/18, 19; 235/380; 364/707; 348/634, 730; 331/51; H04N 3/24

[56] References Cited

U.S. PATENT DOCUMENTS

| 5,266,750 | 11/1993 | Yatsuzuka | 345/174 |
| 5,371,693 | 12/1994 | Nakazoe | 364/707 |
| 5,396,443 | 3/1995 | Mese et al. | 364/707 |
| 5,496,974 | 3/1996 | Akebi et al. | 345/174 |
| 5,568,409 | 10/1996 | Neoh | 364/707 |

FOREIGN PATENT DOCUMENTS

| 0487049 | 5/1992 | European Pat. Off. . |
| 0496383 | 7/1992 | European Pat. Off. . |
| 5-127827 | 5/1993 | Japan . |

OTHER PUBLICATIONS

IBM Technical Disclosure Bulletin, vol. 36, No. 1, Jan. 1993, New York, pp. 157–158, "Screen Programmable Power On Off Switch for Personal Computers".

Research Disclosure, No. 363, Jul. 1994, Havant GB, p. 15, "Computer Devise Start–Up".

*Primary Examiner*—Lin-Yi Lao

[57] ABSTRACT

A touch panel input apparatus has a touch panel which consists of X- and Y-direction electrode panels. When the apparatus is in a power-off state, one end of the X electrode panel is intermittently connected to a power source and one end of the Y electrode panel is intermittently grounded via an output resistor, in response to control signals outputted from a sampling circuit. In this state, synchronously with a clock signal, the sampling circuit performs sampling of a voltage developed across the output resistor when the two electrode panels are brought into contact. The sampling circuit outputs a power-on instruction signal to make the CPU perform the power-on operation. The sampling circuit stops its sampling operation once power is turned on.

20 Claims, 12 Drawing Sheets

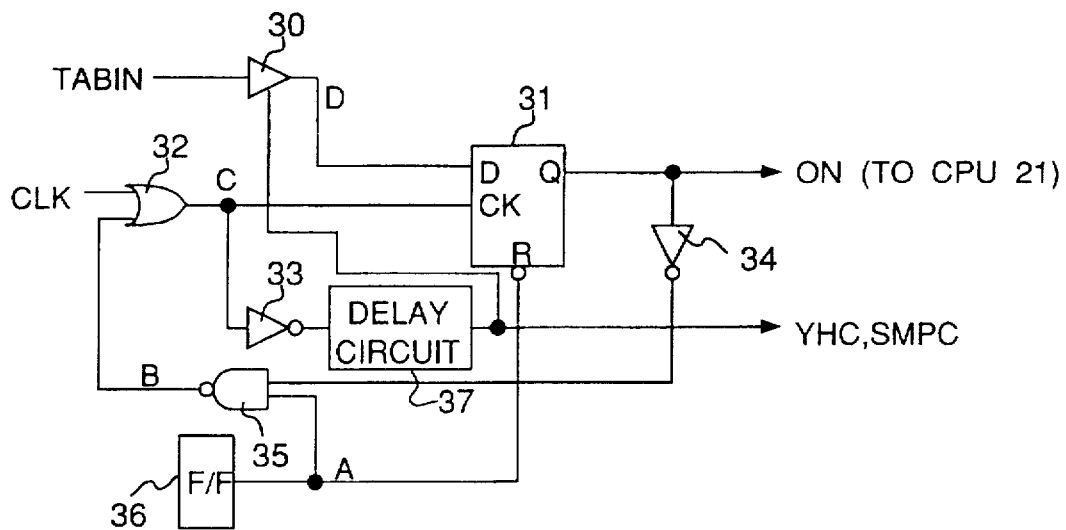
Fig.5
Fig.6A  TIME  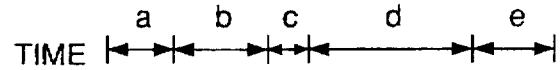
Fig.6B  CLK  
Fig.6C  YHC  
Fig.6D  SMPC  
Fig.6E  TABIN  
Fig.6F  D  
Fig.6G  ON  
Fig.6H  A  
Fig.6I  OPERATION  

*Fig.8A* CLK 
*Fig.8B* YHC} SMPC} 
*Fig.8C* TABIN 
*Fig.8D* D 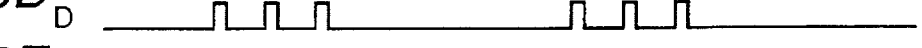
*Fig.8E* Q1 
*Fig.8F* Q2 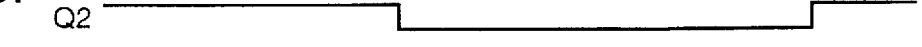
*Fig.8G* Q3 
*Fig.8H* Q4 
*Fig.8I* G 
*Fig.8J* Q5 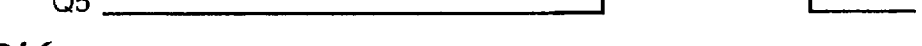
*Fig.8K* Q6 
*Fig.8L* Q7 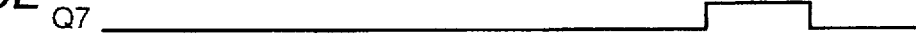
*Fig.8M* ON 
*Fig.8N* F 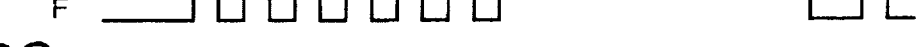
*Fig.8O* A 
*Fig.8P* H 
*Fig.8Q* TOUCH PANEL   PRESSED | NOT PRESSED | PRESSED | NOT PRESSED 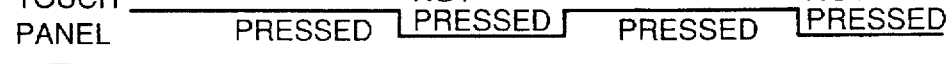
*Fig.8R* TIME   f | g | h | i | j 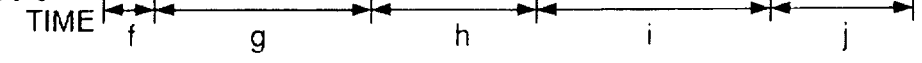

*Fig.10*
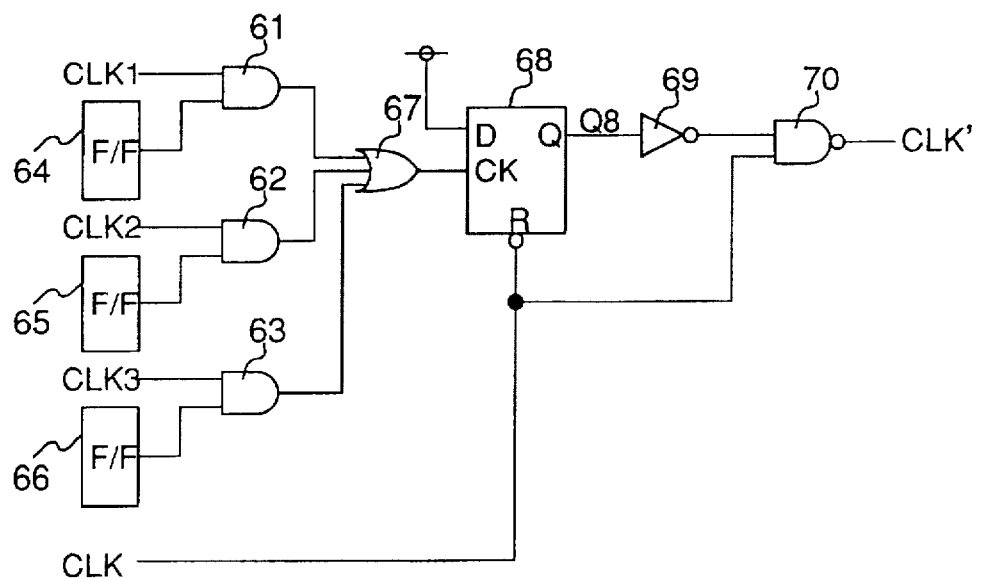
*Fig.11A* CLK 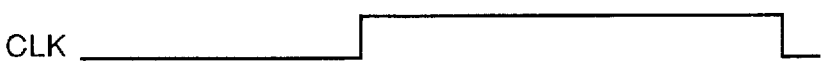
*Fig.11B* CLK1 
*Fig.11C* CLK2 
*Fig.11D* CLK3 

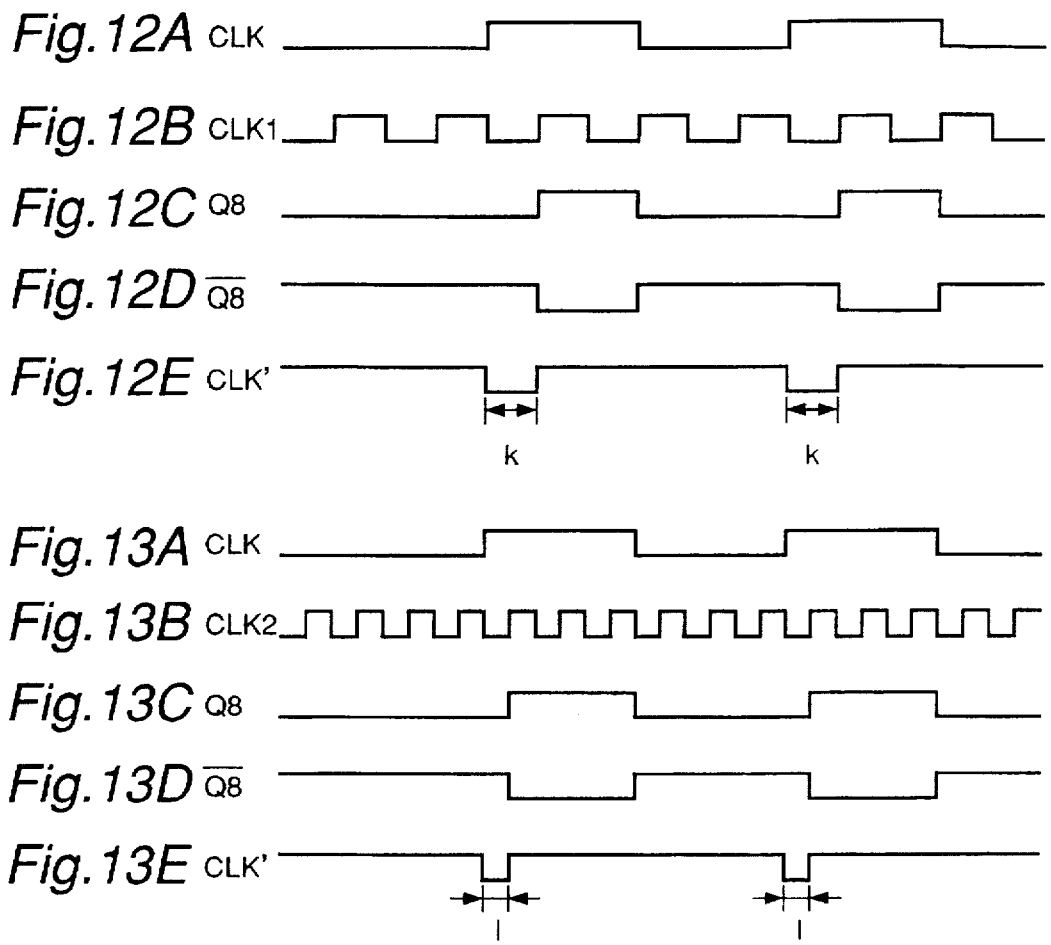
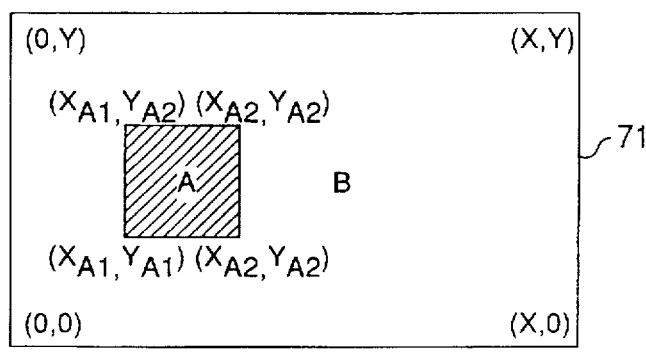

TOUCH PANEL INPUT APPARATUS PERFORMING A SAMPLING OPERATION INTERMITTENTLY

BACKGROUND OF THE INVENTION

1. Field of the Invention

The present invention relates to a touch panel input apparatus for inputting characters or the like with a touch panel constituted of electrode panels each composed of a transparent analog resistance film.

2. Description of the Related Art

FIGS. 18A, 18B and 19 show a prior art touch panel input apparatus (e.g., Japanese Laid-Open Patent Publication No. 5-127827).

In the touch panel input apparatus, an X-direction electrode panel 1 and a Y-direction electrode panel 2 each formed of a transparent electrode are laminated on a display screen such as a liquid crystal display panel or a CRT (cathode ray tube) and bonded to each other. As shown in FIGS. 18A and 18B, a power source Vcc is alternately connected with an end of the X-direction electrode panel 1 and that of the Y-direction electrode panel 2 to generate a voltage distribution in the X-direction and the Y-direction. The X-direction electrode panel 1 and the Y-direction electrode panel 2 are brought into contact with each other at a point thereof by pressing the point with a pen or a finger. The coordinates of the pressed point is detected based on the voltage at the contact point.

In the touch panel input apparatus, when the power source is off, one electrode panel (for example, the Y-direction electrode panel 2) is connected with the power source Vcc (positive power source), while the other electrode panel (for example, the X-direction electrode panel 1) is grounded (negative power source) via an output resistor R, as shown in FIG. 19. A voltage (input signal TABIN) which appears on the output resistor R when both the X-direction electrode panel 1 and the Y-direction electrode panel 2 have been brought into contact with each other is detected. Upon detection of the voltage, an operation of turning on the power source is started.

The conventional touch panel input apparatus has, however, problems as described below:

(1) Normally, the OFF period of time of the power source is long. Thus, if the voltage of the power source Vcc is kept to be applied to the X-direction electrode panel 1 or the Y-direction electrode panel 2 when the power source is OFF, leakage occurs therebetween. If a switch composed of a transistor is used to connect the power source Vcc alternately with the X-direction electrode panel 1 and the Y-direction electrode panel 2, it is necessary to flow electric current through the base of the transistor in turning on the switch. Thus, much electric current is consumed.

(2) The input signal TABIN is always sampled during the OFF time period of the power source Vcc. When a voltage appears on the output resistor R as a result of the contact between the X-direction electrode panel 1 and the Y-direction electrode panel 2 and the level of the input signal TABIN thus becomes "H", it is decided that the power source Vcc has been turned on. Accordingly, it would be unnecessary to execute the sampling operation after a CPU (central processing unit) performs an operation of turning on the power source Vcc. Thus, electric current is wastefully consumed.

If an operator touches the touch panel for only a very short time period during the OFF state of the power source Vcc, the touch panel will have been already brought into a non-pressed state when the CPU becomes active. Therefore the CPU does not know what operation to execute. Further, there is a possibility that an ON signal having a sufficient time width to allow the CPU to become active be not obtained.

(3) If an input buffer taking in the input signal TABIN and outputting it to a sampling circuit is composed of a CMOS (complementary metal oxide film semiconductor), a through electric current flows through the input buffer when the voltage which appears at the output resistor R becomes intermediate between the voltage of the power source Vcc and the ground voltage.

(4) If the apparatus is so designed that the power source is turned on by touching the touch panel and is turned off by pressing a touch key provided on the touch panel, the following operations are repeated while the touch key is kept pressed: the CPU detects that the touch key has been pressed→a power-off operation is performed by the CPU→a sampling operation is started→the CPU detects that the touch key has been pressed→the CPU becomes active→the CPU detects that the touch key has been pressed→ . . . That is, the CPU does not turn the power off until a pen or the like is moved away from the touch key.

(5) Owing to the penetration of electrical noise such as static electricity, there is a possibility that the CPU decides erroneously that the touch panel is not being pressed although it is actually being pressed and vice versa.

(6) If the touch panel input apparatus is used along with an IC card, the IC card may be removed from the apparatus when a card locking switch on the apparatus is turned on. In this case, the CPU should be prohibited from operating. However, even in such a case, a voltage is developed across the resistor R when the touch panel is pressed. As a result, an ON signal is outputted to the CPU.

That is, the prior art apparatus is not so designed that when the card locking switch is turned on, the input signal TABIN is not sampled and that when the card locking switch is turned off, the sampling operation is resumed. Further, the apparatus is not so designed that when the card locking switch is turned off while the touch panel is being pressed, a power-on operation is not executed. Thus, there is inconvenience in using the apparatus.

(7) There is a difference in time period in which the level of the input signal TABIN becomes "H" after the voltage of the power source Vcc is applied to the Y-direction electrode panel 2, depending on the characteristic of the touch panel and the size of a capacitor provided on an input signal line. Therefore, it is necessary to apply the power voltage Vcc for a comparatively long time to the panel. Consequently, electric current is wastefully consumed.

(8) The power source is turned on by the contact between the X-direction and Y-direction electrode panels 1 and 2 of the touch panel. Thus, even when somebody or something touches the touch panel erroneously, a power-on operation is started.

SUMMARY OF THE INVENTION

The present invention has been developed with a view to substantially solving the above-described disadvantages and has for a first object to provide an improved touch panel input apparatus which can reduce consumption of electricity by preventing leakage between opposed X and Y electrode panels and/or an unnecessary sampling operation from occurring.

It is another object to provide a touch panel input apparatus which does not fail to be turned on only by a short-time touch of the panel, but which will not be turned on when unnecessary.

It is another object to provide a touch panel input apparatus which prevents a through electric current from flowing when the voltage appearing at an output resistor is at an intermediate level between the power voltage level and the ground voltage level.

It is a further object to provide a touch panel input apparatus which has a favorable operability with respect to a power-off touch key formed on the touch panel, which avoids a malfunction due to electrical noise, and/or which can be used along with a memory card without any inconvenience.

In order to achieve the aforementioned object, the present invention provides a touch panel input apparatus comprising:

- a touch panel consisting of two electrode panels one of which has a resistance distribution uniform in an X-direction and the other of which has a resistance distribution uniform in a Y-direction;
- a touch panel control circuit for, in a power-on state of the apparatus, alternately applying to the two electrode panels a voltage for generating a voltage distribution therein, and detecting a position voltage generated in the electrode panel to which the voltage is not applied when the two electrode panels are brought into contact with each other at a point thereof; and in a power-off state of the apparatus, connecting one end of one of the two electrode panels with a power source, and at the same time, grounding one end of the other electrode panel via an output resistor, and sampling a voltage which is developed between both terminals of the output resistor when the two electrode panels have been brought into contact with each other;
- contact coordinate calculation means for, in the power-on state, calculating coordinates of a contact position on the touch panel, based on the position voltages of the respective electrode panels detected by the touch panel control circuit and the voltage distributions generated in the respective electrode panels; and
- power-on means for, in the power-off state of the apparatus, executing a power-on operation to turn on power, based on the voltage sampled by the touch panel control circuit;
- wherein the touch panel control circuit comprises:
  - electrode panel control means for, in the power-off state of the apparatus, intermittently connecting the one end of the one electrode panel with the power source synchronously with a clock signal, and at the same time, intermittently grounding the one end of the other electrode panel via the output resistor; and
  - sampling means for, in the power-off state of the apparatus, performing the sampling of the voltage synchronously with the clock signal and outputting a signal indicating whether or not the sampled voltage is equal to or higher than a predetermined level, wherein when the signal indicates that the sampled voltage is equal to or higher than the predetermined level, the signal is used as a power-on instruction signal for making the power-on means start the power-on operation.

In the input apparatus, in the power-off state, by the operation of the electrode panel control means, one end of one of the two electrode panels (X-direction and Y-direction electrode panels) composing the touch panel is intermittently connected with the power source, synchronously with the clock signal, and at the same time, one end of the other electrode panel is intermittently grounded via the output resistor. The sampling means samples a voltage which has appeared at both ends or terminals, of the output resistor, synchronously with the clock signal, when both electrode panels have been brought into contact with each other, and outputs a signal indicating whether or not the sampled voltage is higher than a predetermined level.

As a result, the power-on means executes a power-on operation, based on the signal supplied thereto from the sampling means as the power-on instruction signal.

In this manner, the application of the power supply voltage to the touch panel and the sampling of the voltage which appears on both ends of the output resistor are intermittently performed synchronously with the clock signal.

According to the invention, even though the sampling period is long, a voltage is not applied to the touch panel continuosly and no leakage occurs between the X-direction and Y-direction electrode panels. Further, less electric current is less consumed for a sampling operation than before. That is, the battery has a longer life than before.

In an embodiment, the touch panel control circuit further comprises sampling stop means for stopping a sampling operation of the sampling means when the signal received from the sampling means indicates that the sampled voltage is equal to or higher than the predetermined level; and the sampling means has a signal holding means for holding the signal outputted from the sampling means.

In the apparatus of the above construction, in the power-off state, the sampling means of the touch panel control circuit samples the voltage which appears on both ends of the output resistor, and outputs the signal indicating whether or not the sampled voltage is equal to or higher than the predetermined level. The signal holding means holds the signal outputted from the sampling means. Then, the sampling stop means of the touch panel control circuit stops the sampling operation of the sampling means when the sampled voltage is equal to or higher than the predetermined level.

As described above, when the voltage which has appeared on both ends of the output resistor and is equal to or higher than the predetermined level is sampled, the signal holding means holds the signal indicating that the sampled voltage is equal to or higher than the predetermined level and the sampling stop means stops the sampling operation of the sampling means.

That is, the apparatus does not perform the sampling operation after the power-on instruction signal has been outputted. Thus, electric current is consumed in a lower quantity.

Further, even though the duration of the sampled voltage is very short because the contact time in which both electrode panels are in contact with each other is very short, the sampling means outputs the power-on instruction signal to the power-on means for a long time thanks to the signal holding means.

Accordingly, the power-on operation can be reliably executed even though the touch panel is touched only for a short time period.

In another embodiment of the invention, the touch panel control circuit comprises:

- an input buffer having an input inhibit mode, the voltage developed between the terminals of the output resistor being supplied to the sampling means through the input buffer; and
- a buffer control circuit for controlling the input buffer such that the input buffer goes into the input inhibit mode when the sampling is not performed.

In this embodiment, during the period of time in which the sampling means does not execute the sampling operation, the through-electric current does not flow through the input buffer, even when the voltage generated between both ends of the output resistor becomes an intermediate potential between the supply voltage and the ground voltage.

In an embodiment, the touch panel control circuit comprises:

a first latch circuit for latching and outputting to the power-on means the signal outputted from the sampling means;

a second latch circuit for latching the signal outputted from the sampling means; and latching operation control means for controlling the first and second latch circuits based on the signal latched by the second latch circuit such that the first latch circuit stops a latching operation when the sampled voltage is equal to or higher than the predetermined level and that the first latch circuit starts a latching operation and the second latch circuit stops a latching operation when the sampled voltage is lower than the predetermined level.

In the input apparatus with the above construction, the second latch circuit of the touch panel control circuit latches the signal outputted from the sampling means. Then, at the start time of the sampling operation, the latching operation control means stops the latching operation of the first latch circuit when it is detected that the sampled voltage is equal to or higher than the predetermined level, based on the signal latched by the second latch circuit and starts the latching operation of the first latch circuit when it is detected that the sampled voltage is lower than the predetermined level, so as to stop the latching operation of the second latch circuit.

Thus, the touch panel is being pressed when the sampling means has started the sampling operation, the first latch circuit does not output the power-on instruction signal to the power-on means. As a result, the power-on operation is not executed.

Accordingly, the following operation circulation to be executed when a stop key, which is a touch key on the touch panel, is kept being pressed is cut off: power-off operation→sampling operation→CPU detects that touch panel (stop key) has been pressed→power-on operation→CPU detects that stop key region has been pressed→power-off operation.

In an embodiment, the second latch circuit has a predetermined number of latch portions for sequentially latching the signal outputted from the sampling means, and wherein when all the latch portions have latched the signal indicating that the sampled voltage is lower than the predetermined level, the latching operation control means makes the first latch circuit start the latching operation and makes the second latch circuit stop the latching operation, and when at least one of the latch portions has latched the signal indicating that the sampled voltage is equal to or higher than the predetermined level, the latching operation control means makes the first latch circuit stop the latch operation.

In this case, signals outputted from the sampling means are sequentially latched by the predetermined number of latch portions constituting the second latch circuit of the touch panel control circuit. When the latching operation control means detects that all the latch portions have latched the signal, respectively indicating that the sampled voltage is lower than the predetermined level, the latching operation of the first latch circuit is started and the latching operation of the second latch circuit is stopped.

In this construction, when nonpressing of the touch panel is detected by the second latch circuit the same number of times as the number of the latch portions at the start time of the sampling operation of the sampling means, the first latch circuit outputs the power-on instruction signal to the power-on means. As a result, the power-on operation is executed.

According to the invention, the power source cannot be turned on by pressing the touch panel until a predetermined period of time passes after the power source is turned off.

Thus, according to the present invention, in such a case that because internal processing is being executed in the power-off operation, the power-on operation cannot be started, the power-on operation is prohibited from starting even though the touch panel is pressed.

In a further embodiment, the touch panel control circuit comprises:

a latch circuit having a predetermined number of latch portions for sequentially latching the signal outputted from the sampling means; and means connected between the latch portions and the power-on means for receiving the signal latched by each latch portion and outputting the power-on instruction signal to the power-on means when all of the signals received from the latch portions indicate that the sampled voltage is equal to or higher than the predetermined value.

In the input apparatus with this construction, signals outputted from the sampling means are sequentially latched by the predetermined number of latch portions constituting the latch circuit of the touch panel control circuit. When means for outputting the power-on instruction signal detects that all the latch portions of the latch circuit have latched the signal indicating that the sampled voltage is higher than the predetermined level, the means signal outputs the signal latched by the latch portions as the power-on instruction signal to the power-on means. As a result, the power-on operation is started.

In this construction, when the latch circuit detects pressing of the touch panel the same number of times as the number of the latch portions, the power-on operation is executed.

Accordingly, noise such as static electricity or an erroneous pressing of the touch panel do not cause the power-on operation to be started.

The input apparatus of the invention is usable along with an IC card. In this case the apparatus has a switch which is turned on or off depending on a state of the IC card, and the touch panel control circuit has a sampling operation control means for detecting an on/off state of the switch and controlling an operation of the electrode panel control means and that of the sampling means in accordance with the detected state of the switch. When the IC card is in an unlocked state, the operations of the electrode panel control means and the sampling means are stopped. When the touch panel control circuit includes the second latch circuit as mentioned above, the sampling operation control means controls the operation of the second latch circuit as well, so that the operation of the second latch circuit is also stopped when the IC card is in the unlocked state.

When the sampling operation control means of the touch panel control circuit detects that the switch (external factor switch) is ON, for example, it stops the operation of the electrode panel control means and that of the sampling means, whereas when the sampling operation control means detects that the external factor switch is OFF, it releases the electrode panel control means and the sampling means (and the second latch circuit) from the operation-stopped state.

In this construction, when the switch is ON for example (i.e., the IC card is removable) and thus the CPU should not be operated, the power-on operation is not executed.

Furthermore, in the case that the first and second latch circuit are present, the following advantage is obtained. That is, if the touch panel is pressed after the switch returns to an off state for example (i.e., the IC card is locked) and thus the sampling operation is resumed, the first latch circuit does not output the power-on instruction signal to the power-on means. As a result, the power-on operation is not executed.

In an embodiment, the input apparatus has a clock signal generation circuit for generating the clock signal to be supplied to the electrode panel control means and the sampling means, said clock signal generation circuit comprising:

a frequency-divided clock signal selection circuit for selecting a frequency-divided clock signal from among a plurality of frequency-divided clock signals inputted thereto, based on a control signal outputted thereto from outside of the circuit, the frequency-divided clock signals being generated by dividing a reference clock signal having a predetermined frequency; and a clock signal output circuit for generating a signal by changing a length of time during which the reference clock signal is in one of high and low levels to a half period of the selected frequency-divided clock signal, and outputting the generated signal as the clock signal to be supplied to the electrode panel control means and the sampling means.

According to the clock signal generation method as described above, the voltage application time during which a voltage is applied to the touch panel and the sampling time can be easily altered by selecting an appropriate frequency-divided clock signal and changing the length of time during which one of the high or low levels of the reference clock signal continues, by the use of the selected frequency-divided clock signal.

Consequently, the voltage application time and the sampling time can be appropriately set depending on a time between the time when the voltage is applied to the touch panel and the time when a voltage having the predetermined level appears across the output resistor.

The present invention further provides a touch panel input apparatus comprising:

a touch panel consisting of two electrode panels one of which has a resistance distribution uniform in an X-direction and the other of which has a resistance distribution uniform in a Y-direction;

electrode panel control means for, upon receipt of a control signal, alternately applying to the two electrode panels a voltage for generating a voltage distribution therein, while in a power-off state of the apparatus, intermittently connecting one end of one electrode panel with the power source synchronously with a clock signal, and at the same time, intermittently grounding one end of the other electrode panel via an output resistor;

position voltage detecting means for, when the voltage distribution is formed in each electrode panel by the electrode panel control means, detecting a position voltage generated in the electrode panel to which the voltage is not applied when the two electrode panels are brought into contact with each other at a point thereof;

contact coordinate calculation means for calculating coordinates of a contact position on the touch panel, based on the position voltages detected by the position voltage detecting means and the voltage distributions of the respective electrode panels;

sampling means for, synchronously with the clock signal, sampling a voltage which is developed between both terminals of the output resistor when the two electrode panels have been brought into contact with each other, and outputting the control signal to the electrode panel control means when the sampled voltage is equal to or higher than a predetermined level; and power-on means for executing a power-on operation to turn on power.

In an embodiment, the input apparatus further comprises:

coordinate storage means for storing coordinates defining a specific region on the touch panel; and contact position deciding means for, in the power-off state of the apparatus, comparing the contact coordinates found by the contact coordinate calculation means with the coordinates of the specific region to decide whether or not the contact position is located within the specific region;

wherein the power-on means executes the power-on operation when it is decided by the contact position deciding means that the contact position is located within the specific region.

In the apparatus of the above construction, in the power-off state, the supply voltage is intermittently applied to the touch panel. The sampling means samples a voltage which has appeared at both ends of the output resistor when both electrode panels of the touch panel have been brought into contact with each other, and outputs a signal indicating whether or not the sampled voltage is equal to or higher than the predetermined level.

When the signal indicates that the sampled voltage is equal to or higher than the predetermined level, the electrode panel control means applies a voltage to both electrode panels alternately to generate a voltage distribution thereon. Then, the position voltage detecting means detects a position voltage generated on either the X-direction electrode panel or the Y-direction electrode panel to which the voltage has not been applied when a point of the X-direction electrode panel and a point of the Y-direction electrode panel have been brought into contact with each other.

Then, the contact coordinate calculation means calculates the coordinates of a contact position on the touch panel, based on the position voltage detected by the position voltage detecting means and the voltage distribution generated on the X-direction and Y-direction electrode panels. Then, if the contact position deciding means decides that the coordinates of the contact position obtained by the contact coordinate calculation means is located within the specific region by comparing the coordinates of the contact position with the coordinates of the specific region stored in the storage means, the power-on means executes a power-on operation to turn on the apparatus.

In this manner, only when a position within the specific region of the surface of the touch panel is pressed, the power-on operation is performed.

Thus, the power-on operation can be prevented from being erroneously started even though an operator's hand or other persons' hand touches the touch panel by accident. In addition, this construction prevents the other persons to turn on the apparatus intentionally.

In another embodiment, the touch panel input apparatus comprises:

input result storage means for storing in advance a specific input result produced by a specific operation such as drawing a predetermined figure or writing a predetermined character on the touch panel, pressing the touch panel predetermined times, etc;

input result recognizing means for, based on the contact coordinates obtained by the contact coordinate calculation means, recognizing an input result produced by an operator's actual input operation against the touch panel; and input result deciding means for, at the power-off state of the apparatus, deciding whether or not the input result recognized by the input result recognizing means coincides with the input result stored in the input result storing means, wherein the power-on means executes the power-on operation when it is decided by the input result deciding means that the input result recognized by the input result recognizing means coincides with the input result stored in the input result storing means.

In this embodiment, when the signal outputted from the sampling means indicates that the sampled voltage is higher than the predetermined level, the electrode panel control means applies a voltage to both electrode panels alternately to generate a voltage distribution thereon. Then, the position voltage detecting means detects a position voltage generated on either the X-direction electrode panel or the Y-direction electrode panel to which the voltage has not been applied when a point of the X-direction electrode panel and a point of the Y-direction electrode panel have been brought into contact with each other.

Then, the contact coordinate calculation means calculates the coordinates of the contact position on the touch panel, based on the position voltages detected by the position voltage detecting means and the voltage distributions generated on the X-direction and Y-direction electrode panels. Then, the input result recognizing means recognizes an input result produced by the operator's input operation, based on the coordinates of the contact position found by the contact coordinate calculation means. When the input result deciding means decides that the input result recognized by the input result-recognizing means corresponds to the specific input result stored by the input result storing means, the power-on means executes the power-on operation.

That is, only when one performs the specific operation the input result of which is stored, the power-on operation is executed.

Thus, the apparatus is given a secret function of preventing persons other than the user from using it.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 5 is a circuit diagram of a sampling circuit being a constituent of the touch panel control circuit shown in FIG. 1;

FIGS. 6A, 6B, 6C, 6D, 6E, 6F, 6G, 6H, and 6I are timing charts for the sampling circuit shown in FIG. 5;

FIGS. 8A, 8B, 8C, 8D, 8E, 8F, 8G, 8H, 8I, 8J, 8K, 8L, 8M, 8N, 8O, 8P, 8Q, and 8R are timing charts for the sampling circuit shown in FIG. 7;

FIG. 10 is a circuit diagram of a clock signal-generation circuit;

FIGS. 11A, 11B, 11C and 11D are waveform charts of respective clock signals to be supplied to the clock signal-generation circuit shown in FIG. 10;

FIGS. 12A, 12B, 12C, 12D and 12E are timing charts for the clock signal-generation circuit shown in FIG. 10 to which a clock signal CLK1 is inputted as a clock for a flip flop;

FIGS. 13A, 13B, 13C, 13D and 13E are timing charts for the clock signal-generation circuit shown in FIG. 10 to which a clock signal CLK2 is inputted as a clock for the flip flop;

FIG. 14 is an explanatory view of a touch panel on which a region allowing a power-on operation to start is formed;

FIGS. 18A and 18B are diagrams for explaining an input coordinate detection operation executed by a prior art touch panel input apparatus, wherein FIG. 18A shows the X-coordinate detection and FIG. 18B shows the Y-coordinate detection.

DETAILED DESCRIPTION OF THE PREFERRED EMBODIMENTS

A touch panel input apparatus according to an embodiment of the present invention is described below in detail with reference to the drawings.

Figure 1:
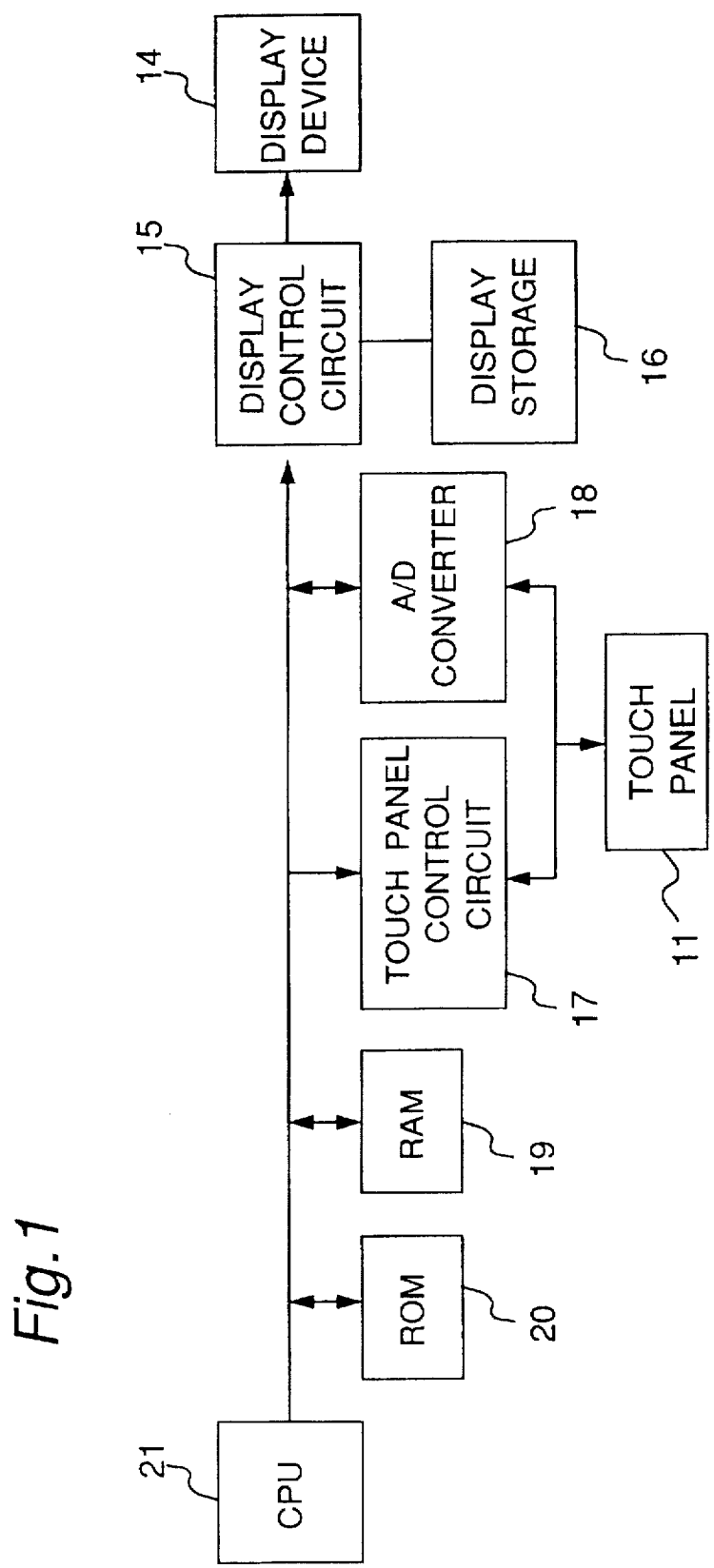
FIG. 1 is a block diagram of a touch panel input apparatus according to an embodiment of the present invention.
Figure 2:
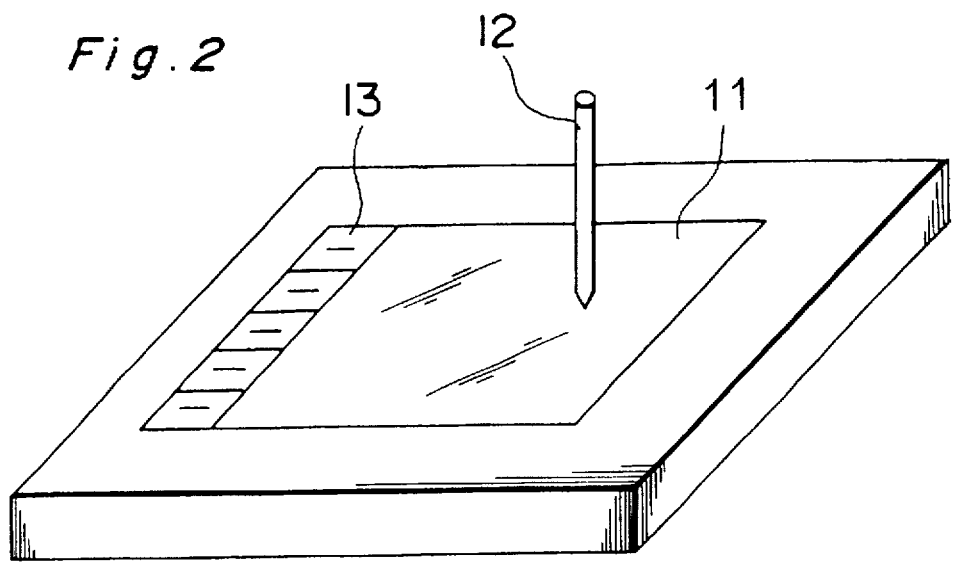
FIG. 2 is a schematic perspective view of the touch panel input apparatus shown in FIG. 1

FIG. 1 is a block diagram of the touch panel input apparatus according to the embodiment. FIG. 2 is a schematic perspective view of the touch panel input apparatus.

Figure 3:
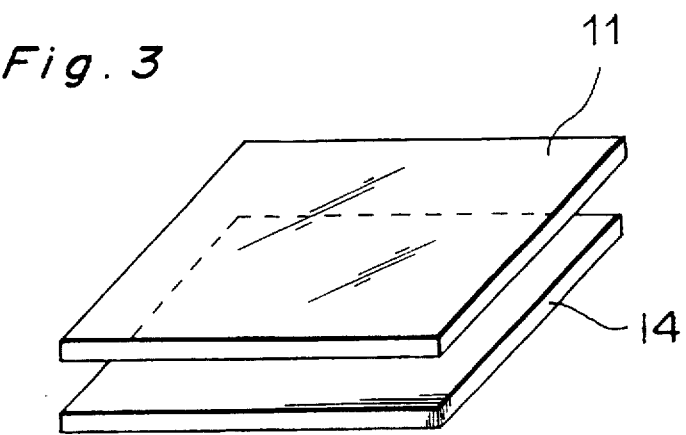
FIG. 3 illustrates a touch panel and a display device to be incorporated in the touch panel input apparatus of FIG. 1, the touch panel being bonding on the display device.

A touch panel 11 of the apparatus is composed of two transparent electrode panels formed of analog resistance films. The two transparent electrode panels are overlaid on each other with a predetermined space interposed therebetween. The touch panel 11 is attached to a display device 14 such as a liquid crystal display panel or a CRT, as shown in FIG. 3. Input of characters and/or figures into the apparatus is carried out by pressing the touch panel 11 with a touch pen 12. A touch key 13 is provided on the touch panel 11 at a predetermined position thereof. The touch key 13 includes a printed sheet bonded to the touch panel 11.

Referring to FIG. 1, a display control circuit 15 controls a display storage 16 and the display device 14 so that an image is displayed on the display device 14 according to image data stored in the display storage 16.

A touch panel control circuit 17 applies voltages different from each other to both ends of each electrode panel constituting the touch panel 11 to form a voltage distribution (voltage inclination) in each electrode panel. When both electrode panels are brought into contact with each other as a result of pressing of the touch panel 11 with the touch pen 12, the touch panel control circuit 17 detects a position voltage generated on each electrode panel and outputs a signal indicating the voltage to an A/D converter 18.

A RAM (Random Access Memory) 19 is used as a work area in which various kinds of control data have been stored. A ROM (Read Only Memory) 20 stores programs for a CPU 21.

The CPU 21 controls the display control circuit 15 so as to write image data to the display storage 16 and display an image on the display device 14. In addition, the CPU 21 controls the touch panel control circuit 17 so as to switch over a voltage to be applied to each electrode panel of the touch panel 11 and calculate the coordinate of an inputted position on the touch panel 11, based on a signal representing the position voltage outputted thereto from the A/D converter 18. Calculation of the coordinate of the inputted position is achieved by collating a detected position voltage with the voltage inclination data stored in the RAM 19.

Figure 4:
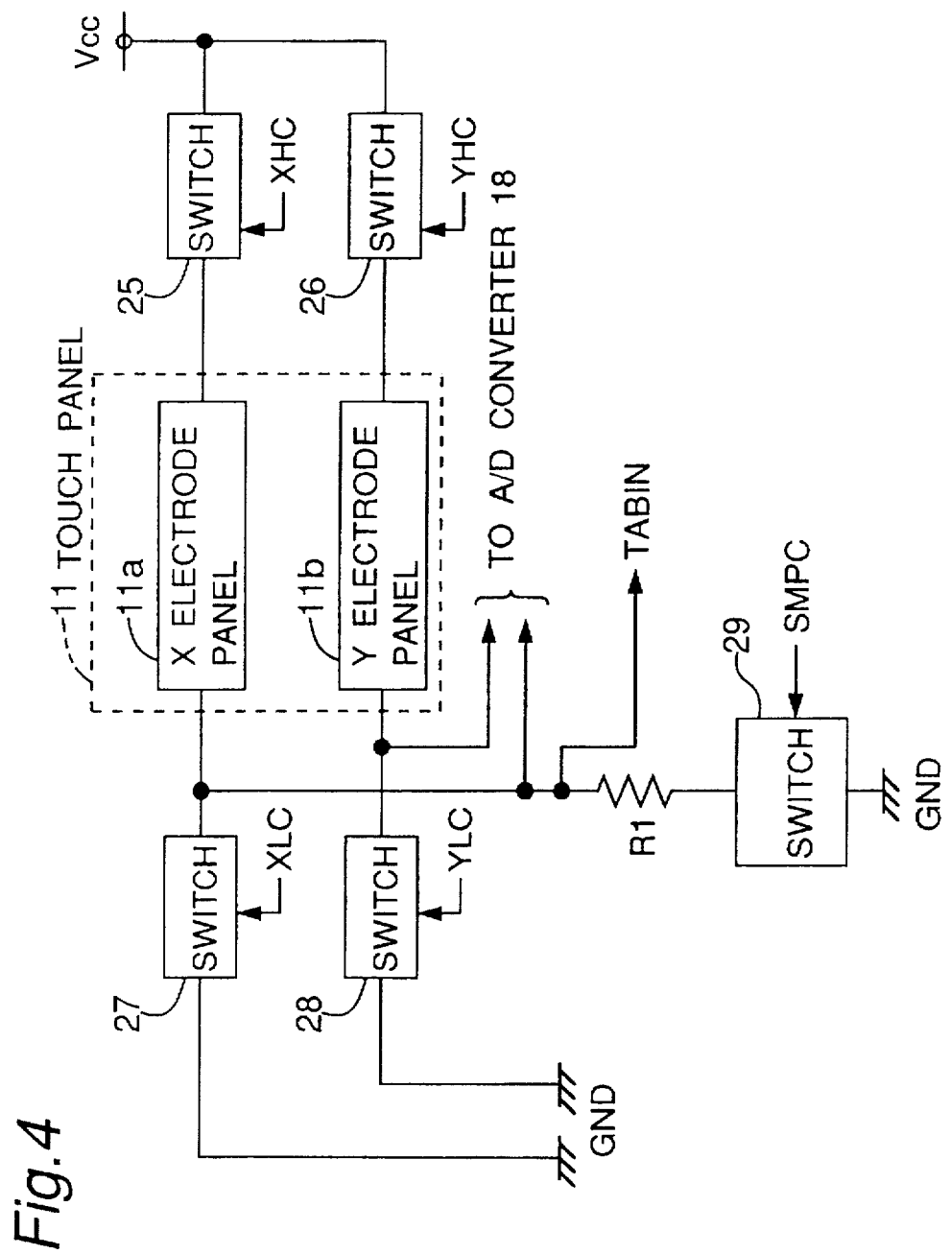
FIG. 4 is a partial circuit diagram of a touch panel control circuit shown in FIG. 1.

FIG. 4 shows a part of the circuit of the touch panel control circuit 17, and the touch panel 11.

The touch panel 11 consists of an upper, X-direction electrode panel 11a and a lower, Y-direction electrode panel 11b. Each of the X-direction and Y-direction electrode panels 11a and 11b has a resistor network having a uniform resistance distribution.

One end of the X-direction electrode panel 11a is connected with a power source Vcc via a switch circuit 25 which is controlled to be turned on and off by a control signal XHC. The other end of the X-direction electrode panel 11a is grounded not only via a switch circuit 27 which is turned on and off by a control signal XLC, but also via an output resistor R1 and a switch 29 which is turned on and off by a control signal SMPC, the output resistor R1 and the switch 29 being connected in series.

Similarly, one end of the Y-direction electrode panel 11b is connected with the power source Vcc via a switch circuit 26 which is turned on and off by a control signal YHC, while the other end thereof is grounded via a switch circuit 28 which is turned on and off by a control signal YLC.

The said other end of the X-direction electrode panel 11a and that of the Y-direction electrode panel 11b are also connected with the A/D converter 18 and the control circuit provided subsequently to the A/D converter 18.

The touch panel input apparatus having the construction as described above is operated as will be described below under the control of the CPU 21 to detect the coordinate of the inputted position on the touch panel 11.

That is, the electrode panels 11a and 11b each have a uniform resistance distribution. Thus, in detecting the X-coordinate of the inputted position, the voltage of the power source Vcc is applied across the X-direction electrode panel 11a by setting the levels of the control signals XHC and XLC to "H" to turn on the switch circuits 25 and 27. As a result, the uniform voltage distribution is generated in the X-direction electrode panel 11a. Further, the other switch circuits 26 and 28 are turned off by setting the levels of the control signals YHC and YLC to "L".

When a point on the X-direction electrode panel 11a is pressed with the touch pen 12 in this state, the electrode panels 11a and 11b are electrically connected with each other at the pressed point, which causes a voltage corresponding to the pressed position on the X-direction electrode panel 11a to be developed in the Y-direction electrode panel 11b positioned below the X-direction electrode panel 11a of the touch panel 11. The A/D converter 18 performs an analog-to-digital conversion of the voltage as the position voltage, and outputs the digital value of the voltage to the CPU 21. Based on the position voltage, the CPU 21 calculates the X-coordinate of the pressed position, as described above.

Similarly, in detecting the Y-coordinate of the pressed position, the voltage of the power source Vcc is applied across the Y-direction electrode panel 11b by setting the levels of the control signals YHC and YLC to "H" to turn on the switch circuits 26 and 28. As a result, a uniform voltage distribution is generated in the Y-direction electrode panel 11b. Further, the levels of the control signals XHC and XLC are set to "L" to turn off the switch circuits 25 and 27.

When a point of the X-direction electrode panel 11a is pressed with the touch pen 12, the A/D converter performs the analog-to-digital conversion of a position voltage which has appeared on the X-direction electrode panel 11a, and outputs the digital value of the voltage to the CPU 21. Based on the position voltage, the CPU 21 calculates the Y-coordinate of the pressed position, as described above.

The X-coordinate and Y-coordinate of the pressed position are alternately detected by time sharing by alternately turning on the switch circuits 25 and 27 and turning off the switch circuits 26 and 28, and turning off the switch circuits 25 and 27 and turning on the switch circuits 26 and 28, respectively.

The description on an on/off control method for the switch circuits 25 through 28 in detecting the coordinates of the pressed position is omitted herein, because it is not directly related with the present invention.

In the touch panel input apparatus according to this embodiment, a power-on operation is performed by pressing the X-direction electrode panel 11a during a power-off state of the apparatus.

The power-on operation is described below.

In the power-off state, the level of each of the control signals XHC, XLC, and YLC is set to "L", while the level of each of the control signals YHC and SMPC is set to "H". By so doing, the end of the Y-direction electrode panel 11b is connected with the power source Vcc, while the end of the X-direction electrode panel 11a is grounded via the output resistor R1.

When a point of the X-direction electrode panel 11a is pressed in this state, the X-direction and Y-direction electrode panels 11a and 11b are electrically connected with each other to form a series circuit of the Y-direction electrode panel 11b, the X-direction electrode panel 11a, and the output resistor R1 between the power source Vcc and the GND. Thus, electric current flows in the order of the power source Vcc→the switch circuit 26→the Y-direction electrode panel 11b→the X-direction electrode panel 11a→the output resistor R1→the switch circuit 29→the GND.

In this case, a value of a voltage which appears between both ends or terminals of the output resistor R1 is obtained by dividing the power source voltage Vcc by the resistance value of the output resistor R1 plus the resistance values of both the X-direction and Y-direction electrode panels 11a and 11b [(a resistance value between the power source Vcc and the contact point on the Y-direction electrode panel 11b)+(a contact resistance value between the X-direction and Y-direction electrode panels 11a and 11b)+(a resistance value between the contact point on the X-direction electrode panel 11a and a connection point at which the output resistor R1 is connected)]. Thus, by setting the voltage (that is, a voltage of an input signal TABIN) across the output resistor R1 at a value, for example, 0.8×Vcc, which can be recognized as an "H" level by the CPU 21, the power-on operation can be accomplished by the input signal TABIN through the intermittent sampling of the input signal TABIN.

The sampling operation of the input signal TABIN is described below.

FIG. 5 is a circuit diagram of a sampling circuit which constitutes a part of the touch panel control circuit 17 and samples the input signal TABIN. FIGS. 6A–6I are timing charts for the sampling circuit.

The sampling circuit has an input buffer 30 having a function of preventing a through-electric current from flowing therethrough, flip-flops 31 and 36, an OR gate 32, invertors 33 and 34, a NAND gate 35, and a delay circuit 37. A clock signal CLK to be inputted to the OR gate 32 has a low frequency, for example, 32 Hz. The clock signal CLK is generated by a clock circuit.

The flip-flop 36 is controlled by the CPU 21 such that the level of a signal A is set to "H" when the sampling circuit is operated and to "L" when the operation of the sampling circuit is stopped.

During a time period in which the power source is disconnected and the signal A is at a "L" level, such as a time period (a) shown in FIG. 6A, the flip-flop 31 is reset and a signal ON for causing the CPU 21 to execute the power-on operation is also set at a "L" level. Thus, the CPU 21 does not execute the power-on operation.

When the level of the signal A is "L", the level of a signal B outputted from the NAND gate 35 becomes "H", and the level of a signal C to be supplied as a clock signal to the flip-flop 31 which samples the input signal TABIN is fixed at an "H" level. Therefore, the sampling operation is stopped.

Furthermore, because the level of the signal C is "H", the level of each of the control signals YHC and SMPC to be outputted from the delay circuit 37 to the switch circuits 26 and 29 becomes "L". As a result, one end of the Y-direction electrode panel 11b and the output resistor R1 are not electrically connected with the power source Vcc and the GND, respectively. Accordingly, a voltage does not appear at both ends of the output resistor R1, and thus the level of the input signal TABIN becomes "L".

Because the output signal of the delay circuit 37 is "L", the input buffer 30 goes into an input inhibit mode. Thus, even though the input signal TABIN has an intermediate potential between the voltage of the power source Vcc and the ground voltage, a through-electric current is prevented from flowing through a CMOS transistor constituting the input buffer 30.

When the level of the signal A becomes "H" under the control of the CPU 21 in the power-off state in a time period (b) shown in FIG. 6A, the level of the signal B becomes "L" because the level of the signal ON outputted from the flip-flop 31 is "L" then. As a result, the waveform of the signal C to be supplied to the flip-flop 31 has the same waveform as that of the clock signal CLK. Thus, the sampling operation is started.

In this case, when the level of the signal C is "L", the level of each of the control signals YHC and SMPC outputted from the delay circuit 37 becomes "H". As a result, the one end of the Y-direction electrode panel 11b and the output resistor R1 are connected with the power source Vcc and the GND, respectively. When the level of the signal C (a clock signal for the flip-flop 31) changes from "H" to "L", the input signal TABIN is latched by the flip-flop 31. Because the level of the input signal TABIN is "L" in the time period (b), the level of the signal ON is also "L".

When the signal C has risen completely to the "H" level, the level of an output signal of the delay circuit 37 becomes "L"; the input buffer 30 goes into an input-inhibit mode; and the level of each of the control signals YHC and SMPC also becomes "L". In this case, the use of the delay circuit 37 delays the timing at which the flip-flop 31 enters the input-inhibit mode and the timing at which the level of each of the control signals YHC and SMPC becomes "L" until the latch operation of the flip-flop 31, which is started at the leading edge of the signal C, is completed.

When both the X-direction and Y-direction electrode panels 11a and 11b are brought into contact with each other as a result of pressing a point on the X-direction electrode panel 11a with the touch pen 12 while in the time period (b) the sampling is being carried out, the input signal TABIN rises to the following voltage in a time period (c) shown in FIG. 6A:

Vcc×{R1/(R1+resistance values of the electrode panels 11a and 11b)}

When the level of the input signal TABIN has exceeded a threshold a of the input buffer 30, the level of a signal D to be inputted to the flip-flop 31 becomes "H", and the input signal TABIN is latched at the rise, i.e., leading edge, of the signal C (i.e., clock signal CLK). As a result, the level of the signal ON to be outputted to the CPU 21 becomes "H", and thus the CPU 21 starts the power-on operation.

Because the level of each of the signals ON and A is "H" in a time period (d) shown in FIG. 6A, the level of the signal B outputted from the NAND gate 35 becomes "H" and the level of the signal C is fixed at "H". As a result, the input buffer 30 goes into the input inhibit mode, and the level of each of the control signals YHC and SMPC becomes "L". As a result, the Y-direction electrode panel 11b and the output resistor R1 are electrically disconnected with the power source Vcc and the GND, respectively.

When the CPU 21 completes the power-on operation and consequently the apparatus is turned on, the CPU 21 controls the flip-flop 36 to set the level of the signal A to "L" in a time period (e) shown in FIG. 6A. As a result, the flip-flop 31 is reset and consequently, the level of the signal ON becomes "L".

As described above, in this embodiment, when the CPU 21 has completed the power-on operation, the CPU 21 resets the flip-flop 31 which latches the input signal TABIN. Thereafter, the sampling of the input signal TABIN is not executed. Hence, electric current is not wasted. Further, the input signal TABIN is inputted to the flip-flop 31 via the input buffer 30 designed such that the through or pass electric current is prevented from flowing therethrough. Specifically, when the control signals YHC and SMPC are at a "L" level, the input buffer 30 goes into the input inhibit mode, so that, even when the input signal TABIN has an intermediate potential between the power voltage Vcc and the ground voltage, a through electric current does not flow through the input buffer 30.

Because the electrical connection between one end of the Y-direction electrode panel 11b and the power source Vcc and that between the GND and the output resistor R1 are made intermittently during the sampling operation, synchronously with the clock signal CLK, leakage is prevented from occurring between the X-direction and Y-direction electrode panels 11a and 11b, and an amount of consumption of electric current can be reduced even though the sampling operation lasts long. That is, the battery has a long life.

In addition, because the input signal TABIN is latched at the rise or leading edge of the clock signal CLK, external noise does not cause malfunction of the apparatus to occur easily.

The flip-flop 31 holds the state of the signal D, which becomes an "H" level when the level of the input signal TABIN has exceeded a threshold α of the input buffer 30, until the CPU 21 releases it. Thus, even though the Y-direction electrode panel 11b is pressed for a very short time, the CPU 21 is reliably capable of recognizing a power-on instruction.

Figure 7:
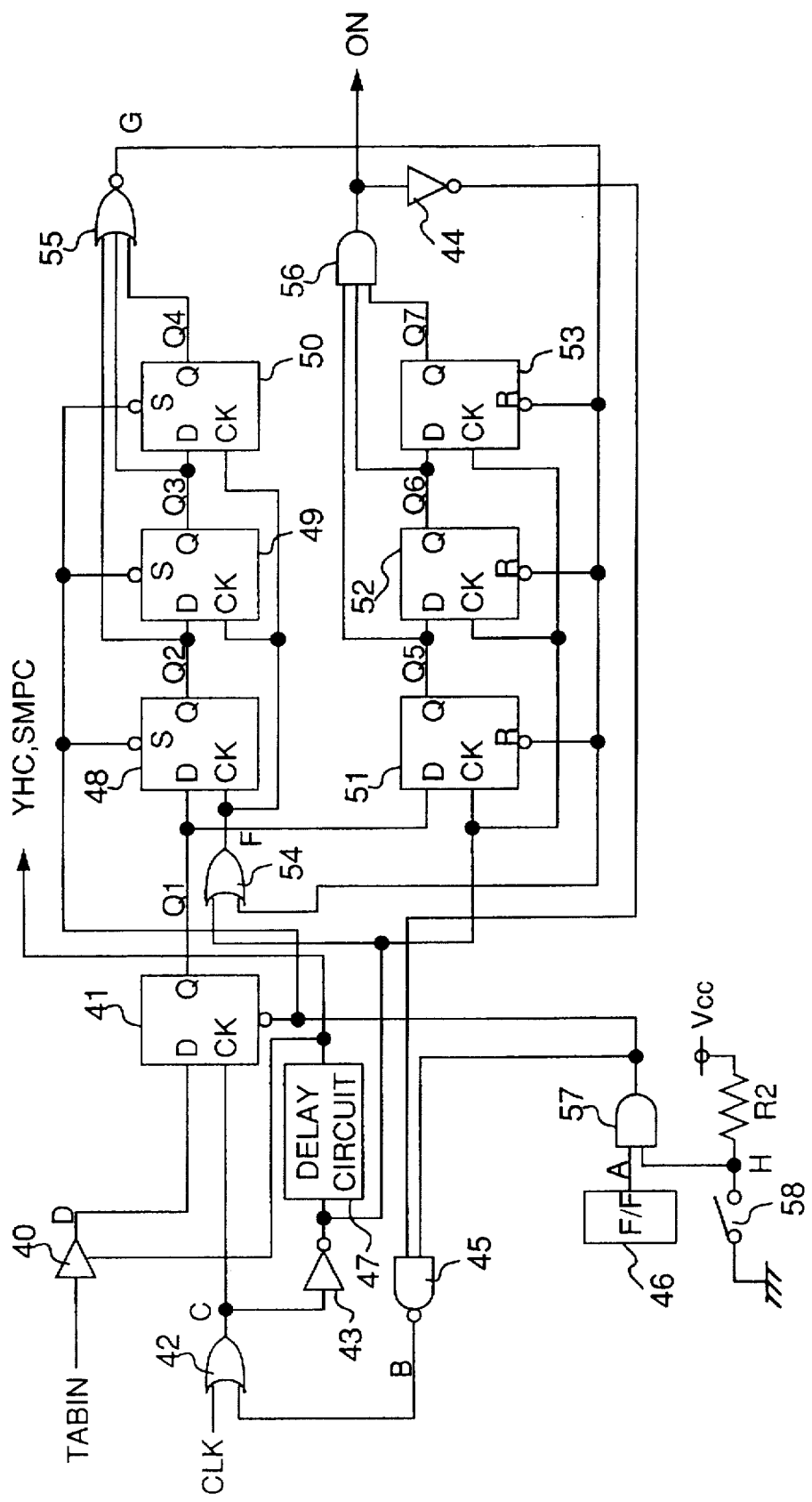
FIG. 7 is a circuit diagram of a sampling circuit different from that shown in FIG. 5.

FIG. 7 is a circuit diagram of a sampling circuit different from that shown in FIG. 3. FIG. 3 is a timing chart of the sampling circuit shown in FIG. 7.

The sampling circuit has a card locking switch 58 serving as an outer factor switch. This sampling circuit is designed to start the power-on operation when pressing of the touch panel 11 has been detected three times in sequence.

The sampling circuit has an input buffer 40, flip-flops 41 and 46, invertors 43 and 44, a NAND gate 45, and a delay circuit 47. Each of these members has the same construction and operation as those of each of the input buffer 30, the flip-flops 31 and 36, the OR gate 32, the invertors 33 and 34, the NAND gate 35, and the delay circuit 37 of the sampling circuit shown in FIG. 5.

In addition, the sampling circuit has flip-flops 48–53, an OR gate 54, a 3-input NOR gate 55, a 3-input AND gate 56, and an AND gate 57.

The sampling circuit having the above construction performs a sampling operation as will be described below with reference to the timing charts shown in FIGS. 8A–8R.

Referring to a time period (f) shown in FIG. 8R, when the level of the signal A outputted from the flip-flop 46 becomes "L" under the control of the CPU 21 in a state that power is not yet turned on and that the card locking switch 58 is open, the flip-flops 48 through 50 are preset so that the levels of all output signals Q2–Q4 become "H". As a result, the level of an output signal G of the 3-input NOR gate 55 becomes "L". As a result, the flip-flops 51–53 are reset so that the levels of all output signals Q5–Q7 become "L", and the level of the signal ON outputted from the 3-input AND gate 56 to the CPU 21 also becomes "L". Thus, the power-on operation is not performed.

Because the level of the signal A is "L" in the time period (f), as described above, the flip-flop 41 is reset, and the level of an output signal Q1 thereof becomes "L" as in the sampling circuit shown in FIG. 5. Because the level of the signal ON is also "L", the level of the signal C is always "H", and thus the sampling operation is stopped. The level of each of the control signals YHC and SMPC also becomes "L", and thus the input buffer 40 goes into the input inhibit mode.

When the level of the signal A becomes "H" under the control of the CPU 21, the level of the signal B becomes "L", and a clock is inputted to the flip-flop 41 and as a result, the sampling operation is started. Then, the level of each of the control signals YHC and SMPC becomes "H" intermittently, synchronously with the clock signal CLK. Consequently, the input buffer 40 is released from the input inhibit mode, and the input signal TABIN is latched when the level of the signal C (i.e., a clock signal of the flip-flop 41) is changed "H".

In this case, the level of the signal Q1 outputted from the flip-flop 41 becomes "H" when the touch panel is kept to be pressed as in a time period (g), and hence, the level of the output signal Q2 of the flip-flop 48 also becomes "H". As a result, the level of the output signal G of the 3-input NOR gate 55 becomes "L", and the level of the signal ON also becomes "L", so that the power-on operation is not performed.

When the touch panel is not pressed as in a time period (h), the output signal Q1 of the flip-flop 41 becomes "L". As a result, the flip-flop 48 latches the output signal Q1 at the next leading edge of the clock signal CLK, and the level of the output signal Q2 becomes "L". Each time the clock signal CLK rises, the level of each of the output signals Q3 and Q4 becomes "L". In this way, the levels of all the output signals Q1 through Q4 become "L". As a result, the level of the output signal G of the 3-input NOR gate 55 becomes "H", and the level of a signal F outputted from the OR gate 54 to the flip-flops 48–50 as a clock signal therefor is fixed at "H", with the result that the latch operation of the flip-flops 48–50 is stopped.

Because the level of the output signal G is "H", the flip-flops 51–53 are released from the reset state and the latch operation thereof is started. Because the touch panel is not pressed as described above, the level of the signal ON is "L".

When the touch panel is pressed at a point thereof with the touch pen and as a result, the X-electrode and Y-electrode panels are brought into contact with each other during the sampling operation in the time period (h), the voltage of the input signal TABIN rises synchronously with the level "H" of the control signals YHC and SMPC in a time period (i) shown in FIG. 8R. When the level of the input signal TABIN has exceeded the threshold a of the input buffer 40, the level of the signal D inputted to the flip-flop 41 becomes "H", and the input signal TABIN is latched at the rise of the signal C (i.e., the clock signal CLK).

Thereafter, the flip-flops 51–53 sequentially latch the input signal TABIN at the step-down or trailing edge of the clock signal CLK, and as a result, the levels of the output signals Q5–Q7 become "H" sequentially. When the level of each of the output signals Q5–Q7 has become "H", the level of the signal ON outputted from the 3-input AND gate 56 to the CPU 21 becomes "H", and thus the CPU 21 starts the power-on operation.

When the level of the signal ON becomes "H", the level of the signal B of the NAND gate 45 becomes "H" in association with the output of the invertor 44, and the level of the signal C which is the clock to be supplied to the flip-flop 41 is fixed at "H". When the power-on operation has been started, the sampling operation is stopped and the level of the signal ON is fixed at the level "H".

The card locking switch 58 is closed when an IC card is releasably inserted in the apparatus, whereas the card locking switch 58 is open when the inserted IC card is locked so that it is not releasable.

When the inserted IC card gets removable in the time period (i) shown in FIG. 8R, the card locking switch 58 is turned on. Then, the voltage level at a contact point H becomes "L" in a time period (j), and the level of the output signal of the AND gate 57 also becomes "L". As a result, the flip-flop 41 is reset, the flip-flops 48–50 are preset, and the flip-flops 51–53 are reset.

Accordingly, the level of the signal ON to be supplied to the CPU 21 becomes "L" and hence, the CPU 21 does not perform the power-on operation.

When the IC card comes into a removable state in the time periods (g) and (h), the card locking switch 58 is turned on. As a result, the flip-flop 41 is reset, the flip-flops 48–50 are preset, and the flip-flops 51–53 are reset.

Accordingly, even in the time periods (g) and (h) the sampling operation is suspended and the level of the signal ON becomes "L". Thus, the CPU 21 does not perform the power-on operation.

When the IC card is brought into a locked state in the time period (j), the card locking switch 58 is turned off or open. Then, the level of the output signal of the AND gate 57 becomes "H". This state is the same as the state in which the level of the signal A has become "H" under the control of the CPU 21 in the time period (g). Therefore, the time period (g) starts and it is checked whether or not a tablet keeps being pressed.

As described above, the sampling circuit shown in FIG. 7 has the flip-flops 48–50 and 51–53 for detecting that the touch panel 11 has been pressed in a power-off state by sequentially latching the output signal Q1 of the flip-flop 41 having a function of latching the input signal TABIN. At the change of the level of the signal A from "L" to "H" under the control of the CPU 21, the flip-flops 51–53 are reset so that the sampling operation is stopped, if any one of the output signals Q2–Q4 of each of the flip-flops 48–50 has become "H", i.e., when the touch panel 11 has been pressed.

As described above, unless the unpressed state of the touch panel 11 continues for a time corresponding at least three sampling time periods from a point at which the level of the signal A has become "H" in the power-off state, the sampling operation is suspended. As a result, the following effect can be obtained.

When the CPU 21 should not be turned on because data is being written to an EEPROM (electrically erasable and programmable ROM), an instruction of turning on the power source cannot be issued to the CPU 21 even though the touch panel 11 is pressed.

Suppose that a "stop key" which is one of the touch keys 13 mounted on the touch panel 11 is pressed to turn off power. In this case, the CPU 21 decides that a pressed position of the touch panel 11 is in the stop key region, thus executing the power-off operation. Then, the sampling operation is started by setting the signal A outputted from the flip-flop 46 of the sampling circuit to an "H" level. If the stop key region of the touch panel 11 is kept pressed at this time, an instruction of turning on the power source is not issued to the CPU 21.

In this manner, the following operation circulation which takes place in the prior art when the stop key is kept pressed is cut off: detection of the stop key region having been pressed→power-off operation→sampling operation→detection of the touch panel 11 (stop key) having been pressed→power-on operation→detection of the stop key region having been pressed→. . . .

Once the sampling operation is started by releasing the flip-flops 51–53 from the reset state by means of the flip-flops 48–50, the CPU 21 executes the power-on operation when the levels of the output signals Q5–Q7 of the flip-flops 51–53 have all become "H".

As described above, the power-on operation is not started unless the pressed state of the touch panel 11 continues for a time corresponding to at least three sampling periods. In this manner, the execution of the power-on operation due to penetration of noise such as an instantaneous static electricity is prevented.

Furthermore, as described above, the sampling circuit of FIG. 7 is provided with the card locking switch 58 designed to be open while the IC card is locked. When the IC card is unlocked and thus the card locking switch 58 is turned on, the flip-flop 41 is reset and the input buffer 40 is placed in the input-inhibition mode. Accordingly, in the sampling circuit, if the IC card is in a removable state, the sampling operation is stopped to prevent an instruction indicating the execution of the power-on operation from being issued to the CPU 21. Thus, this construction prevents malfunction from occurring due to insertion and/or removal of the IC card while the CPU 21 is in operation.

In the sampling circuit, the program goes to a subsequent step after detecting three times nonpressing of the touch panel after the level of the signal A becomes "H" in the power-off state. The number of detection times can be increased or decreased according to the number of the flip-flops 48–50. On the other hand, instructions to turn on power (i.e., to perform the power-on operation) are supplied to the CPU 21 after detecting three times the nonpressing of the touch panel in the state in which the power-on operation can be executed. The number of detection times for the issuance of the instructions can be also increased or decreased according to the number of the flip-flops 51–53.

Figure 9:
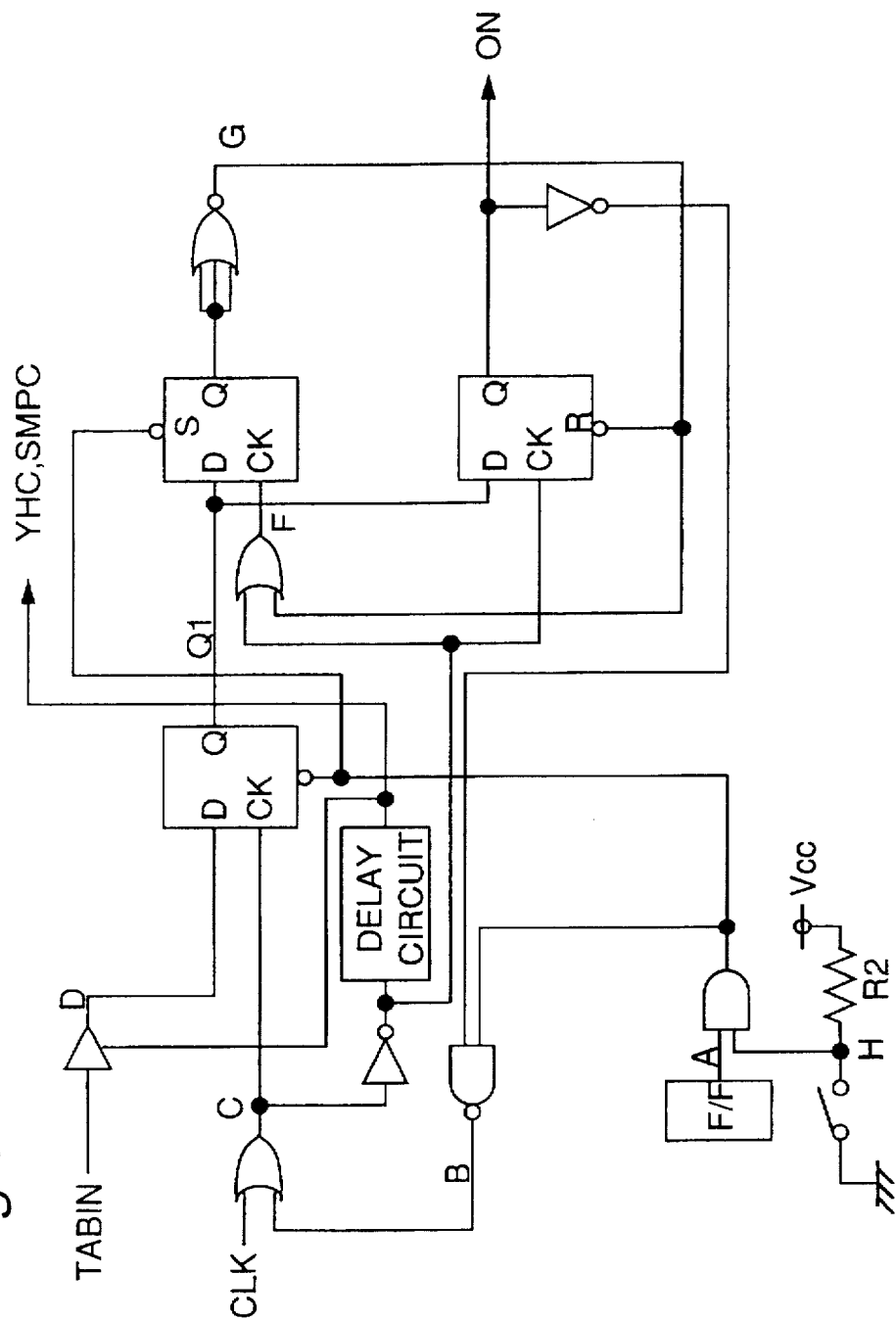
FIG. 9 is a circuit diagram of a sampling circuit different from those shown in FIGS. 5 and 7.

A sampling circuit shown in FIG. 9 stops a sampling operation if the nonpressed state of the touch panel is detected once when the level of the signal A becomes "H" in the power-off state. The sampling circuit give an instruction to execute the power-on operation if a pressed state of the touch panel is detected once in the state in which the power source can be turned on.

As shown in FIGS. 6A–6I and FIGS. 8A–8R, it is only while the level of the clock signal CLK is "L" that the level of each of the control signals YHC and SMPC is "H" and thus the voltage of the power source Vcc is applied to the touch panel 11. Accordingly, the period of time in which the voltage of the power source Vcc is applied to the touch panel 11 can be varied by changing the duty of the clock signal CLK.

FIG. 10 is a circuit diagram of a clock signal generation circuit for generating the clock signal CLK to be inputted to the OR gates 32 and 42 of the sampling circuit shown in FIGS. 5 and 7, respectively.

As shown in FIGS. 11A–11D, clock signals CLK1, CLK2, and CLK3 having frequencies three times, six times, and 12 times as high as that of the clock signal CLK, respectively are inputted to each of AND gates 61–63. Output signals of flip-flops 64–66 are inputted to the AND gates 61–63, respectively. The level of the output signal of each of the flip-flops 64–66 is set by the CPU 21. Output signals of the AND gates 61–63 are inputted to a 3-input OR gate 67.

In the clock signal-generation circuit having the above construction, the frequency of the clock signal to be supplied to a flip-flop 68 can be selected depending on the level of the output signal of each of the flip-flops 64–66.

For example, suppose that the level of the output signal of the flip-flop 64 is set to "H" and that the level of the output signal of each of the flip-flops 65 and 66 is set to "L". In this case, the clock signal CLK1 is inputted to the 3-input OR gate 67. As a result, the clock signal CLK1 is inputted to the flip-flop 68 as the clock thereof.

FIGS. 12A–12E and 13A–13E are timing charts of the clock signal-generation circuit shown in FIG. 10. FIG. 12A through 12E are timing charts showing the case in which the clock signal CLK1 is inputted to the flip-flop 68 as the clock thereof. FIG. 13A through 13E are timing charts showing the case in which the clock signal CLK2 is inputted to the flip-flop 68 as the clock thereof.

Referring to FIGS. 12A–12E and 13A–13E, when the level of the clock signal CLK is "L", the flip-flop 68 is reset to turn the level of the output signal Q8 to "L". When the level of the clock signal CLK is "H", the flip-flop 68 is released from the reset state, and a data signal ("H" level) is latched at the rise of the clock (clock signal CLK1 or clock signal CLK2). As a result, the level of the output signal Q8 becomes "H". Because the level of the data signal is fixed at "H", the level of the output signal Q8 remains "H" when the level of the clock rises. That is, the level of the output signal Q8 remains fixed at "H" until the level of the clock signal CLK becomes "L" and the flip-flop 68 is reset.

The output signal Q8 of the flip-flop 68 is inputted to a NAND gate 70 via an invertor 69. The level of an output signal CLK' of the NAND gate 70 becomes "L" only when the level of the clock signal CLK is "H" and that of the output signal Q8 is "L". That is, each time period (k. 1) in which the level of the output signal CLK' is "L" appears in the half cycle of any one of the clock signals CLK1–CLK3 selected by the flip-flops 64–66. In other words, the output signal CLK' is a clock signal generated by changing the time period in which the level of the output signal CLK is "L" by means of any one of the clock signals CLK1–CLK3.

The clock signal CLK' generated in this manner is inputted to each of the sampling circuits as the clock signal CLK.

The time period in which the voltage of the power source Vcc is applied to the touch panel 11 can be changed by altering the time width of the "L" level of the clock signal CLK, namely, the clock signal CLK' to be inputted to the sampling circuits.

That is, according to the clock generation circuit, if there is a difference in time required from the application of the power voltage Vcc to the touch panel 11 until the turning to an "H" level of the input signal TABIN, depending on the characteristic of the touch panel 11 and the size of a capacitor provided on an input signal line, the "L" level period of the clock signal CLK is controlled so that the time period in which the power voltage Vcc is applied to the touch panel 11 is adjusted so as to allow the level of the input signal TABIN to become reliably "H".

In the description made above, the frequency of the clock signal CLK is multiplied by an integer to obtain the clock signals CLK1, CLK2, and CLK3, but they can be obtained by dividing a reference clock signal having a higher frequency.

The execution of the power-on operation can be prevented from being erroneously started by setting or specifying a position in the touch panel 11 in which the touch panel is to be pressed in issuing the power-on operation to the CPU 21, even though an operator's hand or other persons' hands touch the touch panel 11 by accident.

FIG. 14 is an explanatory view showing a touch panel 71 having a region in which the power-on operation is started when the region is pressed and a region in which the power-on operation is not started when it is pressed.

The touch panel 71 is provided with a region A which is surrounded by coordinates $(X_{A1}, Y_{A1})$, $(X_{A1}, Y_{A2})$, $(X_{A2}, Y_{A2})$, and $(X_{A2}, Y_{A1})$ and pressing of which causes the power-on operation to be started, and a region B which does not cause the power-on operation to be started when pressed. The coordinates $(X_{A1}, Y_{A1})$ and $(XA_2, Y_{A2})$ are stored in the RAM 19.

Figure 15:
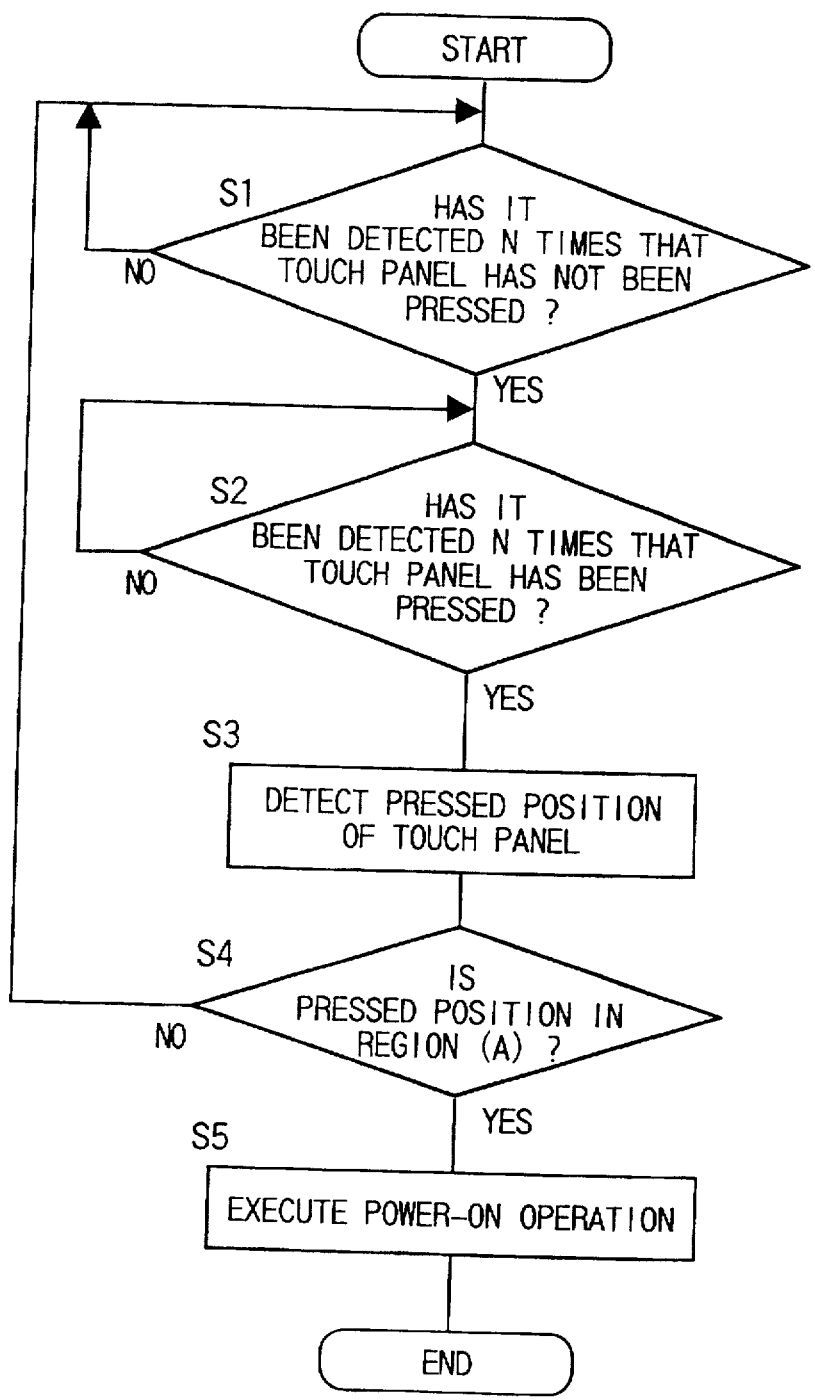
FIG. 15 is a flowchart showing a power-on control operation to be executed by a touch panel input apparatus in which the touch panel shown in FIG. 14 used.

FIG. 15 is a flowchart of the power-on control operation to be executed by the CPU 21 and the touch panel control circuit 17 when the touch panel 71 is used. The sampling circuit to be mounted on the touch panel control circuit 17 is the sampling circuit (wherein detection number of nonpressing/pressing of the touch panel 71 is "N") shown in FIG. 7.

The power-on control operation will be described below with reference to FIG. 15.

When the level of the output signal A of the flip-flop 46 of the sampling circuit becomes "H" while the IC card is locked and thus the card locking switch 58 is OFF, the power-on control operation is started.

It is decided at step S1 whether nonpressing of the touch panel 71 has been detected N times in the sampling circuit. If YES, the program goes to step S2.

It is decided at step S2 whether pressing of the touch panel 71 has been detected N times in the sampling circuit. If YES, the program goes to step S3.

At step S3, the CPU 21 controls the touch panel control circuit 17 such that a voltage inclination occurs alternately in the X-direction and Y-direction electrode panels 11a and 11b whereby a position voltage is detected, as described previously. Then, the CPU 21 detects the coordinate of an input position (i.e., a pressed position) on the touch panel 71, based on the position voltage and the data of the voltage inclination, as described previously.

The CPU decides at step S4 whether or not the pressed position on the touch panel 71 is in the region A, based on the detected coordinates of the pressed position on the touch panel 71 and the coordinates $(X_{A1}, Y_{A1})$ and $(X_{A2}, Y_{A2})$ stored in the RAM 19. If YES, the program goes to step S5. If NO, the program returns to step S1.

At step S5, the CPU 21 executes the power-on operation. In this way, the power-on control operation is completed.

The processings at steps S3 through S5 are executed by the CPU 21 activated by the signal ON having an "H" level, which is outputted thereto from the sampling circuit at step S2.

It is possible to provide a mode for registering a power-on operation instruction region so as to set the coordinates $(X_{A1}, Y_{A1})$ and $(X_{A\,2}, Y_{A2})$ to be stored in the RAM 19 as desired, namely, to allow the operator to set the position of the region A on the touch panel as the operator desires. This mode allows the apparatus to have a secret function of preventing persons other than the owner thereof from using it.

Figures 16A, 16B, 16C, 16D:
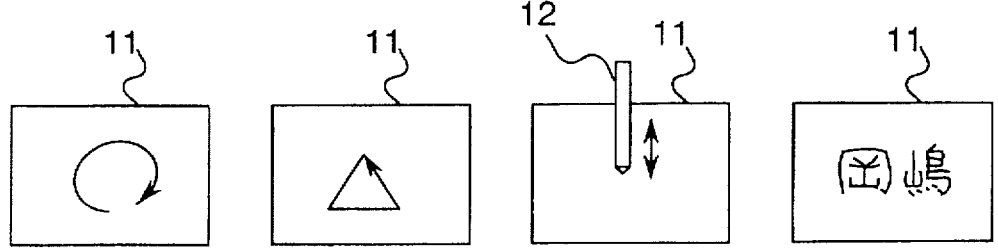
FIGS. 16A, 16B, 16C and 16D illustrate specific actions to cause a power-on operation to be started.

In addition to the above, the secret function can be obtained by designing the apparatus such that the power-on operation is started by a specific input operation such as "drawing a circle" as shown in FIG. 16A, "drawing a triangle" as shown in FIG. 16B, "touch the touch panel three times" as shown in FIG. 16C, "write the user's name" as shown in FIG. 16D, etc.

Figure 17:
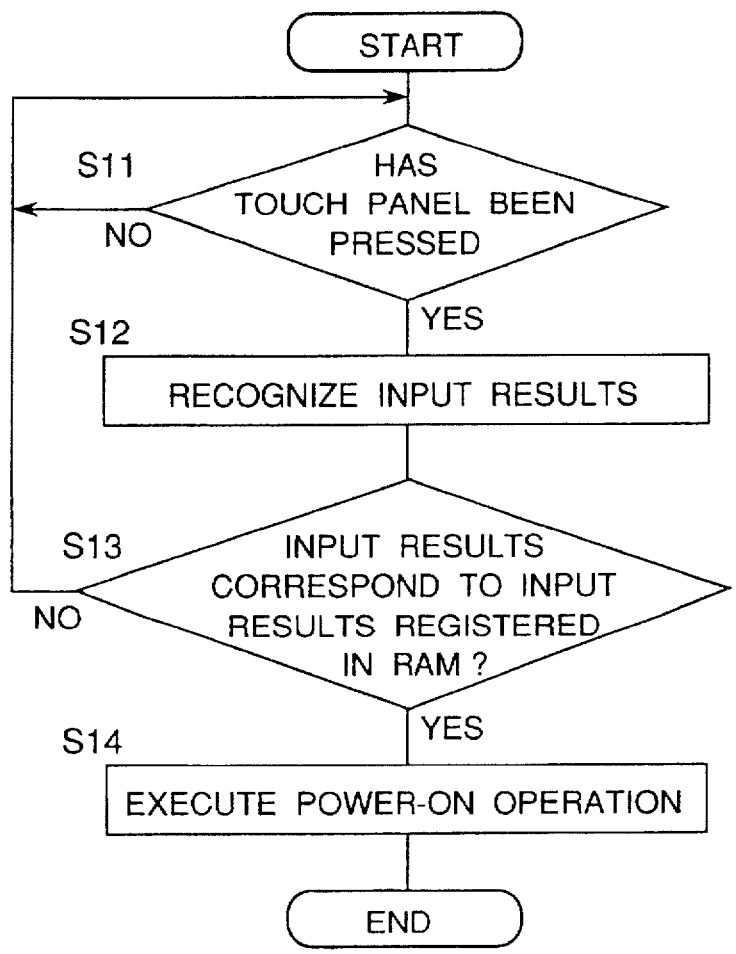
FIG. 17 is a flowchart showing a power-on control operation to be executed by a touch panel input apparatus which executes a power-on operation in response to either of the specific operations.
Figure 18A:
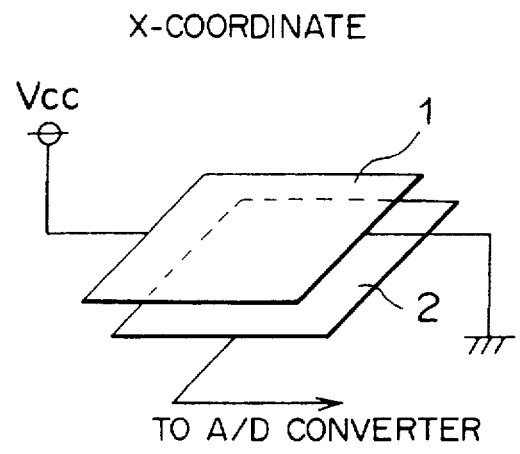
Figure 18B:
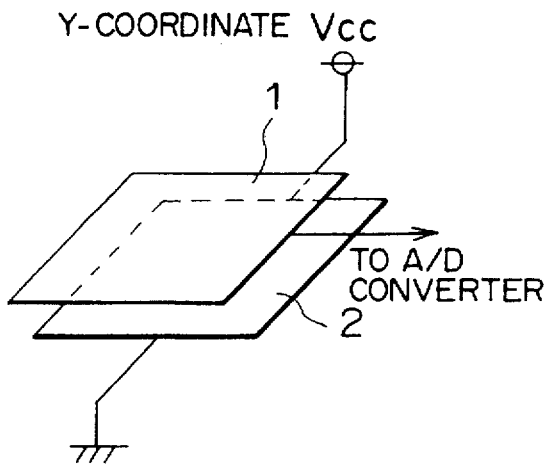
Figure 19:
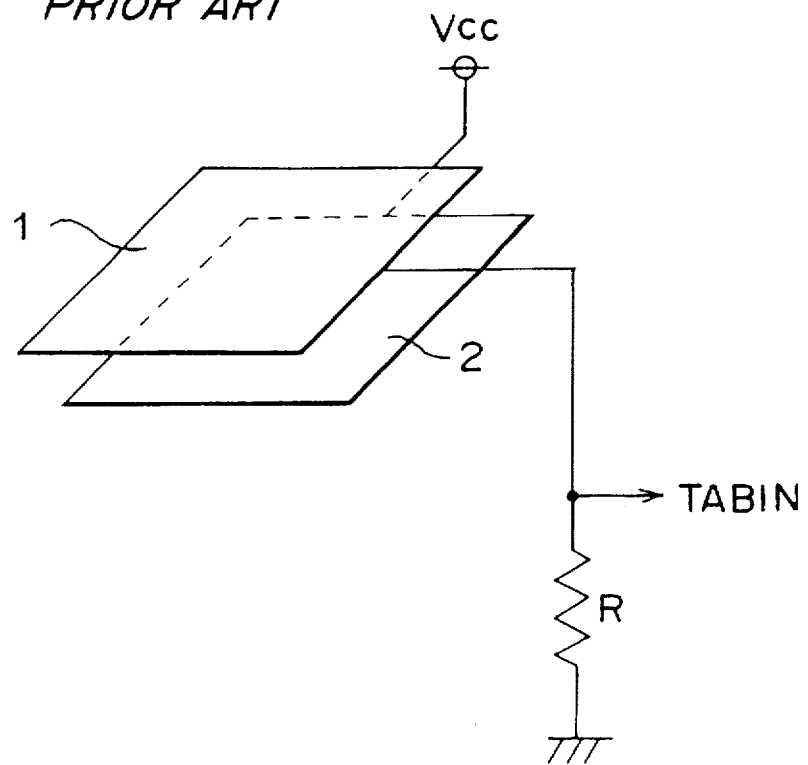
FIG. 19 is an explanatory view showing the way of detecting instructions to perform a power-on operation in the prior art touch panel input apparatus.

FIG. 17 is a flowchart of the power-on control operation to be executed by the CPU 21 and the touch panel control circuit 17 when the power-on operation is executed by performing a specific operation as described above. The sampling circuit to be mounted on the touch panel control circuit 17 is the sampling circuit shown in FIG. 5. The RAM 19 previously stores a result produced by the specific input operation. That is, "figure ○", "figure Δ", "number of touches", and "specific character or characters" are stored in advance in the RAM 19 in correspondence with the input operations shown in FIGS. 16A, 16B, 16C, and 16D, respectively.

The power-on control operation is described below with reference to FIG. 17.

When the level of the output signal A of the flip-flop 36 of the sampling circuit becomes "H", the power-on control operation starts.

It is decided at step S11 whether or not the touch panel 11 has been pressed. If YES, the program goes to step S12.

At step S12, the CPU 21 controls a pen-input recognizing portion (not shown) so as to recognize an input result of the input operation executed at step S11.

It is decided at step S13 whether or not the input operation result recognized at step S12 by the CPU 21 coincides with the input result stored in the RAM 19. If YES, the program goes to step S14, whereas if NO, the program returns to step S11.

At step S14, the CPU 21 executes a power-on operation. In this way, the power-on control operation is completed.

The processings at steps S12 through S14 are executed by the CPU 21 activated by the signal ON having an "H" level outputted thereto from the sampling circuit at step S11.

The algorithm of the power-on control operation is not limited to that of the flowcharts shown in FIGS. 15 and 17.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A touch panel input apparatus comprising:
  a touch panel including two electrode panels one of which has a resistance distribution uniform in an X-direction and the other of which has a resistance distribution uniform in a Y-direction;
  a touch panel control circuit for, in a power-off state of the apparatus, applying a first voltage to one end of one of the two electrode panels, and at the same time, applying a second voltage to one end of the other electrode panel via an output resistance, and sampling a voltage which is developed between both terminals of the output resistance when the two electrode panels have been brought into contact with each other; and
  wherein the touch panel control circuit includes:
    electrode panel control means for, in the power-off state of the apparatus, intermittently applying the first voltage to the one end of the one electrode panel synchronously with a clock signal, and at the same time, intermittently applying the second voltage to the one end of the other electrode panel via the output resistance; and
    sampling means for, in the power-off state of the apparatus, performing the sampling of the voltage synchronously with the clock signal and outputting a signal indicating whether or not the sampled voltage is equal to or higher than a predetermined level, wherein when the signal indicates that the sampled voltage is equal to or higher than the predetermined level, the signal is a power-on instruction signal.

2. The touch panel input apparatus according to claim 1, wherein the touch panel control circuit further includes sampling stop means for stopping a sampling operation of the sampling means when the signal outputted from the sampling means indicates that the sampled voltage is equal to or higher than the predetermined level; and wherein the sampling means includes signal holding means for holding the signal outputted from the sampling means.

3. The touch panel input apparatus according to claim 1, wherein the touch panel control circuit includes:
  an input buffer having an input inhibit mode, the voltage developed between the terminals of the output resistance being supplied to the sampling means through the input buffer; and
  a buffer control circuit for controlling the input buffer such that the input buffer goes into the input inhibit mode when the sampling is not performed.

4. The touch panel input apparatus according to claim 1, wherein the touch panel control circuit includes:
  a first latch circuit for latching and outputting to the power-on means the signal outputted from the sampling means;
  a second latch circuit for latching the signal outputted from the sampling means; and
  latching operation control means for controlling the first and second latch circuits based on the signal latched by the second latch circuit such that the first latch circuit stops a latching operation when the sampled voltage is equal to or higher than the predetermined level and such that the first latch circuit starts a latching operation and the second latch circuit stops a latching operation when the sampled voltage is lower than the predetermined level.

5. The touch panel input apparatus according to claim 4, wherein the second latch circuit has a predetermined number of latch portions for sequentially latching the signal outputted from the sampling means, and wherein when all the latch portions have latched the signal indicating that the sampled voltage is lower than the predetermined level, the latching operation control means makes the first latch circuit start the latching operation and makes the second latch circuit stop the latching operation, and when at least one of the latch portions has latched the signal indicating that the sampled voltage is equal to or higher than the predetermined level, the latching operation control means makes the first latch circuit stop the latch operation.

6. The touch panel input apparatus according to claim 4, which is usable along with an IC card and has a switch which is turned on or off depending on a state of the IC card, wherein the touch panel control circuit has sampling operation control means for detecting an on/off state of the switch, and controlling an operation of the electrode panel control means, that of the sampling means, and that of the second latch circuit in accordance with the detected state of the switch, wherein when the IC card is in an unlocked state, the operations of the electrode panel control means, the sampling means, and the second latch circuit are stopped.

7. The touch panel input apparatus according to claim 1, which is usable along with an IC card and has a switch which is turned on or off depending on a state of the IC card, wherein the touch panel control circuit includes sampling operation control means for detecting an on/off state of the switch, and controlling an operation of the electrode panel control means and that of the sampling means in accordance with the detected state of the switch, wherein when the IC card is in an unlocked state, the operations of the electrode panel control means and the sampling means are stopped.

8. The touch panel input apparatus according to claim 1, further comprising:
  a clock signal generation circuit for generating the clock signal to be supplied to the electrode panel control means and the sampling means, said clock signal generation circuit including:
  a frequency-divided clock signal selection circuit for selecting a frequency-divided clock signal from among a plurality of frequency-divided clock signals inputted thereto, based on a control signal outputted thereto from outside of the frequency-divided clock signal selection circuit, the frequency-divided clock signals being generated by dividing a reference clock signal having a predetermined frequency; and
  a clock signal output circuit for generating a signal by changing a length of time during which the reference clock signal is in one of high and low levels to a half period of the selected frequency-divided clock signal, and outputting the generated signal as the clock signal to be supplied to the electrode panel control means and the sampling means.

9. The touch panel input apparatus according to claim 1, wherein, in a power-on state of the apparatus, the touch panel control circuit alternately generates a voltage distribution in the two electrode panels, and detects a position voltage generated in the electrode panel to which the voltage distribution is not applied when the two electrode panels are brought into contact with each other at a point thereof, said touch panel apparatus further comprising:

contact coordinate calculation means for, in the power-on state, calculating coordinates of a contact position on the touch panel, based on the position voltages of the respective electrode panels detected by the touch panel control circuit and the voltage distributions generated in the respective electrode panels.

10. The touch panel input apparatus according to claim 1, wherein the second voltage is ground.

11. The touch panel input apparatus according to claim 1, further comprising:

power-on means for, in the power-off state of the apparatus, executing a power-on operation to turn on power of the apparatus, the power-on means being responsive to the power-on instruction signal.

12. The touch panel input apparatus according to claim 11 wherein the touch panel control circuit comprises:

a latch circuit having a predetermined number of latch portions for sequentially latching the signal outputted from the sampling means; and means connected between the latch portions and the power-on means for receiving the signal latched by each of said latch portions and outputting the power-on instruction signal to the power-on means when all of the signals received from the latch portions indicate that the sampled voltage is equal to or higher than the predetermined value.

13. The touch panel input apparatus according to claim 1, wherein, the power-off state of the apparatus, the touch panel control circuit connects only the one end of each of said electrode panels to the respective first and second voltages, thereby leaving other ends of said electrode panels electrically open.

14. The touch panel input apparatus according to claim 1, wherein said touch panel consists of said two electrode panels.

15. A touch panel input apparatus comprising:

a touch panel including two electrode panels one of which has a resistance distribution uniform in an X-direction and the other of which has a resistance distribution uniform in a Y-direction;

electrode panel control means for, upon receipt of a control signal, alternately generating a voltage distribution in the two electrode panels, while in a power-off state of the apparatus, intermittently applying a first voltage to one end of one electrode panel synchronously with a clock signal, and at the same time, intermittently applying a second voltage to one end of the other electrode panel via an output resistance;

position voltage detecting means for, when the voltage distribution is formed in each of said electrode panels by the electrode panel control means, detecting a position voltage generated in the electrode panel to which the voltage is not applied when the two electrode panels are brought into contact with each other at a point thereof;

contact coordinate calculation means for calculating coordinates of a contact position on the touch panel, based on the position voltages detected by the position voltage detecting means and the voltage distributions of the respective electrode panels;

sampling means for, synchronously with the clock signal, sampling a voltage which is developed between both terminals of the output resistance when the two electrode panels have been brought into contact with each other, and outputting the control signal to the electrode panel control means when the sampled voltage is equal to or higher than a predetermined level; and power-on means for executing a power-on operation to turn on power.

16. The touch panel input apparatus according to claim 15, further comprising:

coordinate storage means for storing coordinates defining a specific region on the touch panel; and contact position deciding means for, in the power-off state of the apparatus, comparing the contact coordinates found by the contact coordinate calculation means with the coordinates of the specific region to decide whether or not the contact position is located within the specific region;

wherein the power-on means executes the power-on operation when it is decided by the contact position deciding means that the contact position is located within the specific region.

17. The touch panel input apparatus according to claim 15, further comprising:

input result storage means for storing in advance a specific input result produced by a specific operation including at least one of: drawing a predetermined figure on the touch panel, writing a predetermined character on the touch panel, and pressing the touch panel a predetermined number of times;

input result recognizing means for, based on the contact coordinates obtained by the contact coordinate calculation means, recognizing an input result produced by an operator's actual input operation against the touch panel; and input result deciding means for, at the power-off state of the apparatus, deciding whether or not the input result recognized by the input result recognizing means coincides with the input result stored in the input result storing means, wherein the power-on means executes the power-on operation when it is decided by the input result deciding means that the input result recognized by the input result recognizing means coincides with the input result stored in the input result storing means.

18. The touch panel input apparatus according to claim 15, wherein, in the power-off state of the apparatus, the electrode panel control means connects only the one end of each of said electrode panels to the respective first and second voltages, thereby leaving other ends of said electrode panels electrically open.

19. The touch panel input apparatus according to claim 15, wherein the second voltage is different than the first voltage, and the second voltage is ground.

20. The touch panel input apparatus according to claim 15, wherein said touch panel consists of said two electrode panels.

* * * * *